Feb. 9, 1960

L. H. BARRON 2,924,050

DIAMOND EDGED BAND SAW

Filed Sept. 24, 1956

INVENTOR
LEE H. BARRON
BY

ATTORNEY

United States Patent Office 2,924,050
Patented Feb. 9, 1960

2,924,050

DIAMOND EDGED BAND SAW

Lee H. Barron, Glendale, Calif.

Application September 24, 1956, Serial No. 611,724

7 Claims. (Cl. 51—188)

This invention relates to an improved diamond edge-coated steel band saw and to the method of making and using the same.

The principal object of this invention is to provide an improved diamond coated metal band saw which is coated with diamonds on one edge only, with the contiguous margins of the flat faces inside and outside of the band coated also with diamonds to cut a kerf which does not bind the saw. Another object is to provide a diamond coated band saw in which a welded joint is strong enough to hold the band together under operating conditions and is as thick as the diamond coating adjacent said coating so that the joint does not cause pounding or vibration as it passes over or through the piece being cut. Still another object is to provide a diamond coated band saw having uncoated guide strips on the band. A further object is to provide a new method for shaping optical glass and the like.

Metal working tools including grinding wheels which have diamond grits embedded on the grinding or cutting surfaces are well known, but heretofore no one has produced a diamond coated band saw for use on a regular band saw machine which would cut satisfactorily without the frequent binding of the saw in the kerf, with subsequent heating and too rapid destruction of the diamond cutting surface. In the prior art only the cutting edge into which the material is advanced has been set with diamonds, the sides of the band being uncoated. The contact of the plain metal sides of such a band against the narrow kerf surfaces resulted in much friction and frictional heat. In addition, the weak welded joint of the thin continuous band has been a common source of trouble and failure of diamond edged saws. Following the practice in steel saws, the excess metal formed at the abutting ends of the band has heretofore been entirely removed by grinding to give a smooth even surface at the joint, this being necessary to reduce friction and bumping.

These defects have been overcome by the structure and method of producing my improved diamond edge-coated band saw, which will be understood from the following description, reference being made to the accompanying drawings in which.

Figure 1:
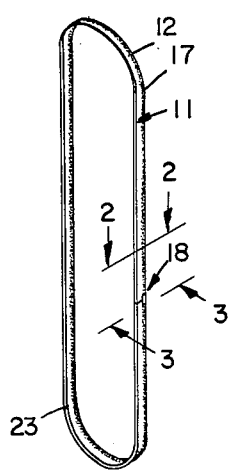
Fig. 1 is a perspective view of a narrow steel band diamond coated on one edge only and on the contiguous marginal surfaces.
Figures 2, 3:
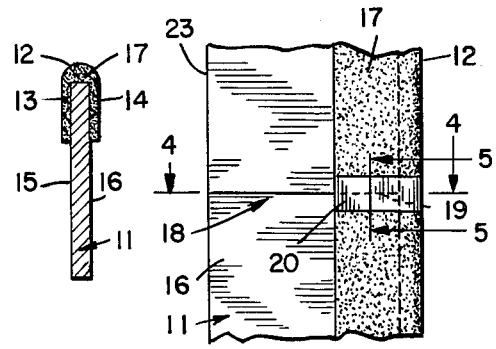
Fig. 2 is a cross-sectional view taken on the line 2—2 of Fig. 1.
Fig. 3 is an enlarged fragmentary elevational view from the position 3—3 of Fig. 1, including the joint area of the band.
Figure 4:
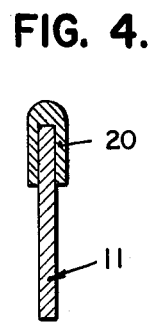
Fig. 4 is a cross-sectional view taken on the line 4—4 of Fig. 3.
Figure 5:
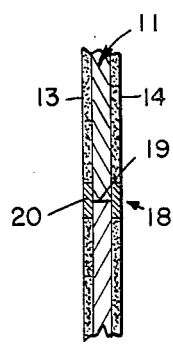
Fig. 5 is a cross-sectional view taken on the line 5—5 of Fig. 3.
Figure 6:
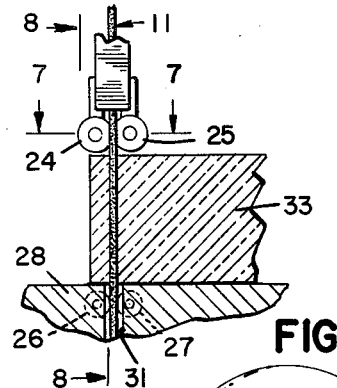
Fig. 6 is a fragmentary view of a length of my diamond edged band saw as held in guide rollers of a band saw machine, cutting through a glass lens block.
Figure 7:
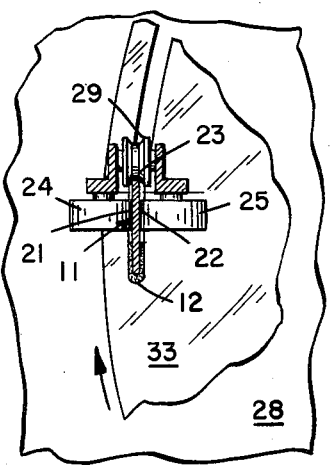
Fig. 7 is a top plan view partly in section taken from the position 7—7 of Fig. 6.
Figure 8:
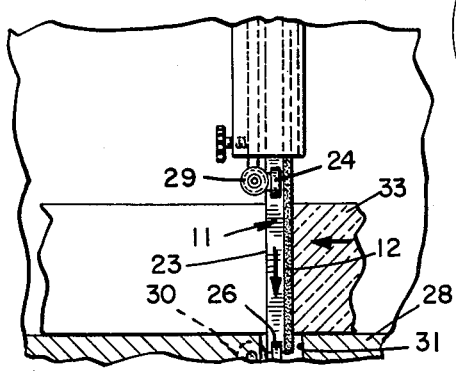
Fig. 8 is a side elevational view partly in section from the position 8—8 of Fig. 6.
Figure 9:
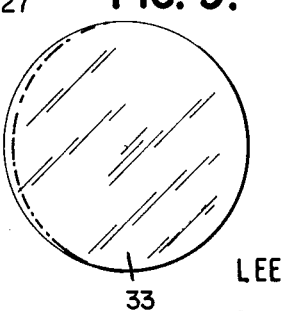
Fig. 9 is a plan view of the optical glass block after cutting.
Figure 10:
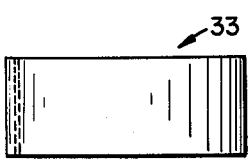
Fig. 10 is a side elevational view of the optical glass block shown in Fig. 9.

Referring to the drawings, Fig. 1 shows in perspective a steel or other metal band 11 coated with diamond grits 17 on its lead edge 12 and the contiguous margins 13 and 14 only of the two flat faces, inner 15 and outer 16, except at the joint area 18. The band 11 may, of course, be of any desired length and other dimensions, and as is customary in the art, the continuous band is formed for example by butt welding to form joint 18. In my process of making the coated saw blade, I prefer to coat the strip on the lead edge and contiguous margins with the diamond grits prior to welding it into a band or ring. The coating of diamond grit on metal grinding or cutting surfaces has long been practiced, and generally consists in electroplating a metallic coating over and around the diamond grit resting on the surface, the diamonds being partly embedded by the electroplated coating. I follow this procedure in a general way, but vary it in accordance with my invention which provides an improved band saw. For example, a flat steel strip 11 approximately ⅜ inch wide and .035 inch in thickness was first cleaned chemically by treating it in a sulfuric acid electrolytic bath with the steel strip as the anode. After cleaning, the steel strip was clamped between smooth non-conductive support strips so that only the one edge and about ⅛ inch margins on the contiguous sides were exposed in an elongated electroplating bath containing a plating liquid such as "Watts" solution (for example, consisting of 10 pounds of nickel sulfate, 1 pound 14½ ounces of nickel chloride and 1 pound 4 ounces of boric acid dissolved in 5 gallons of distilled water. The exposed portion of the steel strip 11 was first given an initial electroplated coating of about .002 inch of nickel. While still in the plating solution and without interrupting the current flow, selected and graded diamond grits were then piled up over the exposed edge and contiguous marginal face surfaces of the band. A coating of pure nickel was then electroplated on the exposed band, embedding and more or less enveloping the diamond grits thereon, this coating being from about .002 inch to .010 inch in thickness, depending upon the grit sizes and other factors. This operation required from 8 to 10 hours with a low current density. The unattached diamond grits were removed, and after washing off the plating solution and drying, the strip was butt welded into a continuous band. The continuous band, depending upon its length, may be made from one or several strips.

Instead of piling up an excess of diamond grits prior to the electroplating of the embedding nickel, the diamond grits may be distributed gradually on to the surfaces to be coated while the electroplating operation is operating.

In the electroplating process as above described, the end portions of the exposed portion of the band or of each length of band, for a short length of ⅛ inch to ¼ inch, are protected against electroplating by a non-conductive coating, or by the connecting clamps which carry the electric current to the band. Short lengths of diamond edge-coated strips may be used as reciprocating saws, although I prefer to form continuous band saws. The ends of the strips, including these bare end portions 18 of the margins which are elsewhere coated with diamonds, are then resistance-welded together to form the butt joint 19. The bead of excess metal at the joint is removed except in the area 18. The welded joint in the marginal area and the lead edge is then covered with brazing metal compound and a brazed joint or coating 20 is formed on both sides by means of a torch, following usual brazing practice. The brazing material may be a copper alloy. The brazed filler 20 is built up to approximately the same thickness as the adjacent diamond grit coating. This composite structure not only greatly strengthens the joint, but also prevents the bump or vibration which results when an unfilled joint portion of a band saw passes through the kerf in the piece being cut. With the space filled in by the brazed material, the coated band runs smoothly, and therefore can be more easily controlled in cutting or finishing the work. The freedom from bumping and vibration also reduces the mechanical strains and stresses in the band, and greatly increases its useful life.

The diamond coated margins adjacent the lead edge of the band as above described not only gives longer life to the thin cutting edge, but also provides a band saw which cuts a kerf slightly wider than the uncoated portion of the band, thus eliminating all possibilities of drag or binding of the saw in the kerf, and permits the cutting of relatively short radius curved cuts. This is not possible with diamond saws having diamonds embedded in the forward cutting edge only.

The diamond edged band saw of my invention may be used for cutting and slicing hard and brittle materials such as optical glass, crystalline alumina, tungsten carbide, glass fiber reinforced plastics, and other materials which are not otherwise satisfactorily cut by other tools and means, including straight and curved cuts.

A new method of shaping and forming optical glass is thus provided by my edge-coated diamond band saw. This is illustrated in Figs. 6 to 10 inclusive. In these figures, the metal band 11 is mounted in a band saw of the usual type, with pairs of side guide rollers 24, 25, 26, and 27 arranged above and below the work table 28, and bearing against the uncoated outer 21 and inner 22 surfaces of the band 11. The trailing edge 23 of the band abuts pressure rollers 29 and 30 mounted respectively above and below the piece to be cut, the lower one being below the work table 28, which is provided with a slot 31 through which the band saw 11 moves. The material to be cut, for example, the block 33 of optical glass is fed into the diamond coated lead edge 12, which accurately slices off the unwanted portions of the block 33 of glass. Water is fed into the kerf to keep the saw lubricated and to wash out the cuttings. Because of the narrow cutting edge, and the diamond coatings on the adjacent margins, the cut is clean and does not bind the uncoated portion of the blade, even when the lead edge is following a curved path. The filler in the uncoated area 18 of the margin coatings 13 and 14 over the butt welded joint or joints in the band, being level with the diamond coating on the margins 13 and 14 and lead edge 12, avoid bumping and vibration, with the resulting smooth operation of the saw, and the freedom from breaking and splintering.

In one case an optical glass block was 23 inches in diameter and 4½ inches thick. Two arcuate segments were sliced from opposite portions of the periphery, these being about 2 inches in maximum thickness and tapering to sharp edges at both ends. These segments remained intact after the cutting and had fairly smooth kerf surfaces. With an 80 grit diamond coating, and the band moving 1700 linear feet per minute, the slicing rate was one-half inch per minute. The total cut of 62 inches was completed in less than three hours. Many times this time would have been required by the old method in which the excess material of the block was removed laboriously by surface grinding.

Other difficult materials may be expeditiously cut and sliced in straight and curved cuts by use of my edge-coated band saw.

This is a continuation-in-part of my copending application Ser. No. 538,052 filed October 3, 1955, now Patent No. 2,784,536 issued March 12, 1957.

I claim:

1. A saw blade consisting of a thin flat metal strip having a compact multi-grid layer of diamond grits in diamond-to-diamond surface contact surrounded by and embedded in an electrodeposited nickel coating on a portion of said strip, said nickel coating and diamond grits extending over one edge only of said strip and over the marginal lengthwise flat surfaces of said strip contiguous to said diamond-coated edge, the width of the diamond coating on said flat surfaces being a small fraction of the width of said metal strip, said multi-grit layer of diamond grits being arranged in positions of natural repose; the other edge and the contiguous lengthwise flat surfaces of said strip being uncoated and of sufficient width to engage guide surfaces to hold said saw blade in operative position in a saw operating machine.

2. A band saw comprising a flat metal strip having diamond grits embedded in a metal coating on portions of said strip as defined in claim 1, said metal strip also having short end portions bare of diamonds for joining the strip into a continuous band; and a welded joint between the bare ends of said strip.

3. A band saw comprising a flat metal strip having diamond grits embedded in a metal coating on portions of said strip as defined in claim 1, said metal strip also having short end portions bare of diamonds for joining the strip into a continuous band; and a welded joint between the bare ends of said strip, said joint adjacent said metal embedded diamonds being built up by melted metal to the thickness of the said diamond grit coating.

4. The method of forming a diamond coated saw comprising the steps of supporting a flat strip of metal between two coextensive non-conductive supports to expose one edge and the contiguous margins immersed in a plating bath while protecting the remainder of said flat strip against electrodeposition; forming a mass of diamond grits over the exposed one edge and in contact with said exposed contiguous margins of said metal strip, electrolytically plating out metal on said strip to form an embedding layer of metal over said exposed margins and said edge and the diamond grits resting thereon and thereagainst; and removing the unattached diamonds from said coated strip.

5. The method of forming a diamond coated saw by the steps defined in claim 4, in which the steps of forming a mass of diamond grits and electroplating out metal to form an embedding metal over said diamond grits are carried on simultaneously.

6. The method of forming a diamond coated band saw comprising the steps of supporting a flat strip of metal between two coextensive non-conductive supports to expose one edge and the contiguous margins immersed in a plating bath while protecting the remainder of said flat strip against electrodeposition; forming a mass of diamond grits over the exposed edge and in contact with said exposed contiguous margins of said metal strip; electrolytically plating out metal on said strip to form an embedding layer of metal over said exposed margins and said edge and the diamond grits resting thereon and thereagainst; forming said strip into an endless band saw by a butt welded joint joining the ends thereof; and filling in the depressed areas over said welded joint adjacent said diamond coated portion by brazing thereon a metal to the approximate thickness of said diamond coating.

7. The method of forming a diamond coated band saw by the steps defined in claim 6, in which the steps of forming a mass of diamond grits and electroplating out metal to form an embedding metal over said diamond grits are carried on simultaneously.

(References on following page)

References Cited in the file of this patent

UNITED STATES PATENTS

| | | |
|---|---|---|
| 1,759,112 | Haddow | May 20, 1930 |
| 2,144,370 | Gerlach | Jan. 17, 1939 |
| 2,306,423 | Bernstorff | Dec. 29, 1942 |
| 2,332,505 | Crompton | Oct. 26, 1943 |
| 2,334,494 | Keeleric | Nov. 16, 1943 |
| 2,361,492 | Pare | Oct. 31, 1944 |
| 2,368,092 | Anderson | Jan. 30, 1945 |
| 2,442,153 | Van Der Pyl | May 25, 1948 |
| 2,706,876 | Levengood | Apr. 26, 1955 |
| 2,784,536 | Barron | Mar. 12, 1957 |